Nov. 3, 1925.

P. F. YUNGLING 1,560,129

BEARING SUPPORT FOR BAILS

Filed July 19, 1924

Inventor:
PAUL F. YUNGLING

By Edmund A. Strange
Attorney.

Patented Nov. 3, 1925.

1,560,129

UNITED STATES PATENT OFFICE.

PAUL F. YUNGLING, OF LOS ANGELES, CALIFORNIA.

BEARING SUPPORT FOR BAILS.

Application filed July 19, 1924. Serial No. 727,090.

*To all whom it may concern:*

Be it known that I, PAUL F. YUNGLING, a citizen of the United States, residing at Los Angeles, in the county of Los Angeles and State of California, have invented a new and useful Improvement in Bearing Supports for Bails, of which the following is a specification.

My invention has relation more specifically to a novel form of bearing designed to be employed in connection with bails, yokes, and like structures.

An important object of my invention is to provide a bearing for mechanical structures that utilize bails or yokes as a suspension means, in which the bail bearing pins may be quickly removed from the structure to release the bail or yoke when for any reason it is desired to repair the structure or renew its parts.

A further object is to provide a bail bearing structure in which the swinging movement of the bail is limited in its downward movement when the structure to which it is secured is removed from its suspension means.

A still further object is to provide a bearing construction for pivoted bails in which the bearing is continually lubricated.

In the accompanying drawings I have illustrated a preferred embodiment of my invention, it being understood however, that no limitation is necessarily made to the precise structural details therein exhibited, but various changes, alterations and modifications may be resorted to within the scope of my invention when desired.

I have as an example illustrated my improved bearing in connection with a rotary swivel hydraulic head, generally employed in the drilling of oil wells by the rotary method, the mud-laden water being introduced through the drill pipe by means of said head, although it may be advantageously used in connection with other bail structures such as casing elevators, casing hooks, and similar devices.

Figure 1:
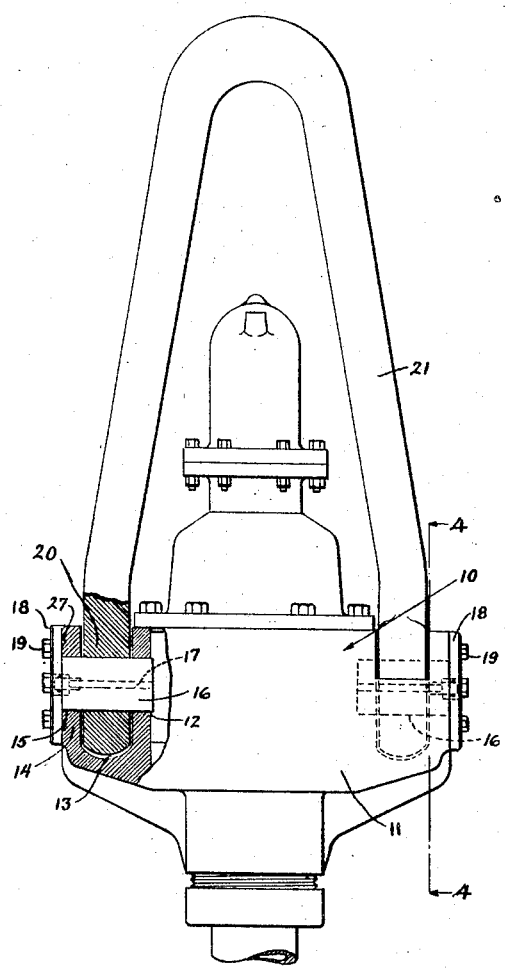
Fig. 1 is a side elevation of a rotary swivel employed in connection with oil wells illustrating one of the bail bearings in section.
Figure 3:
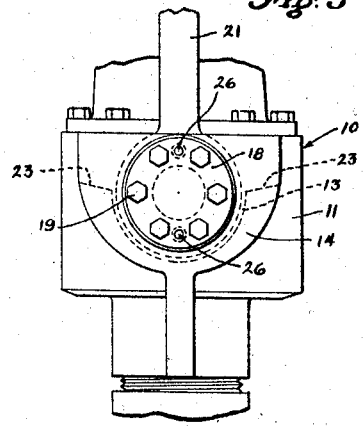
Fig. 3 is an end elevation of one of the bearings.
Figure 4:
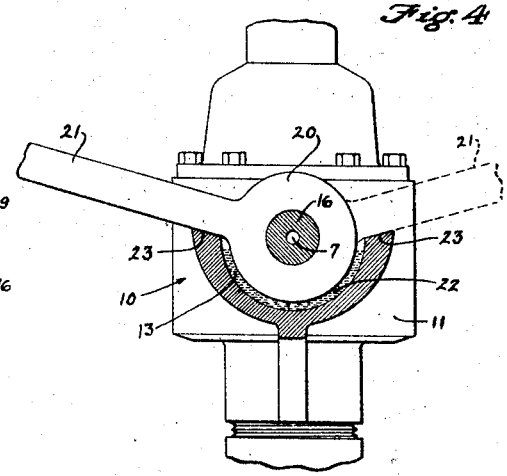
Fig. 4 is a sectional side elevation of the swivel head taken on line 4—4 of Fig. 1, looking in the direction indicated by the arrows.
Figure 2:
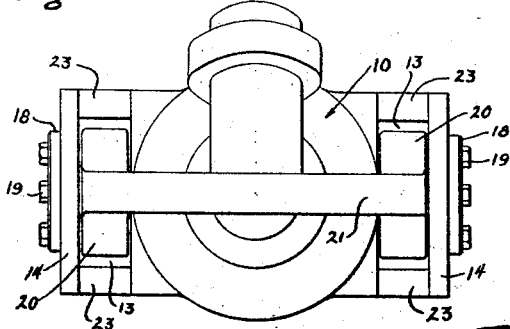
Fig. 2 is a plan view of the same.
Figure 5:
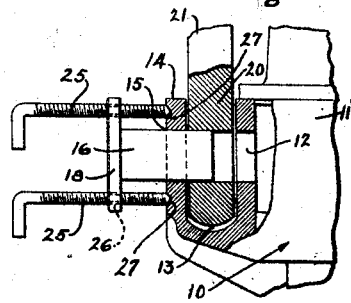
Fig. 5 is a sectional end elevation of one of the bearings showing the method of removing the bearing pins.

Referring more specifically to the drawings, 10 designates a hydraulic swivel head of the type generally employed in the drilling of oil wells by the rotary method. The body of the swivel head comprises a substantially cylindrical casing 11, provided in its wall with oppositely disposed bores 12. Formed integrally with the cylindrical shell 11, and at the openings 12 are cavities 13, their bottom walls being semi-circular, as clearly shown in Figs. 3 and 4 of the drawings. The outer walls 14 of the cavities 13 are each provided with a bore 15 in alinement with the bores 12 formed in the casing wall. Mounted in each pair of bores 12 and 15 is a short stationary pin or spindle 16, provided in the center with a longitudinally disposed oil duct 17, and on the outer end thereof with a circular flange 18, the pins 16 being rigidly secured against movement in the bores 12 and 15 by means of stud bolts 19 which pass through the flanges 18, into the walls 14 of the cavities.

Pivotally secured to the pins 16, is a bail 21, its circular ends being freely movable in the cavities 13 which contain a lubricant 22 such as hard grease for lubricating the bearing pins. The upper ends 23 of the semi-circular bottom walls of the lubricating cavities 13, are disposed slightly above the central longitudinal axis of the bearing pins 16, and are bevelled inwardly. When the head is removed from its suspension means, the bail 21 will swing downwardly to one side or the other of the bearing pins and rest against the ends 23 of the bottom walls of the lubricating cavities. By providing stops to limit the downward movement of the swinging bail, when the same is detached from its support, the operators will experience less difficulty in attaching the bail to the casing hook.

When it is desired to repair the hydraulic swivel head, the bolts 19 which pass through the flange 18 are first removed, and then a pair of screws 25 are inserted in threaded openings 26 of the flange plate 18 and screwed inwardly, the ends of the screws engaging dentures 27 formed in the outer face of the wall 14 of the cavities. It will be obvious that as the screws 25 are forced inwardly the bearing pin 16 will be pulled outwardly and clear of the bearing bores 12 and 15, so as to permit of the removal of the bail from the swivel head. This feature of the invention is considered important, as in similar structures now employed the heads have to be sent to the shop in order to remove the bails therefrom before repairs can be made to the heads, this operation entailing considerable time and expense. By my method of providing removable bearing pins, small repairs or replacements of parts can be effected at the well without the necessity of sending the same to a machine shop at a distance therefrom.

What I claim is:

1. In a device of the character described a body member provided with oppositely disposed bearing bores, bearing pins mounted in said bores, lubricating chambers formed on said body member and surrounding said pins, and a bail pivotally secured to said pins.

2. In a device of the character described a rotary swivel hydraulic head, bearing pins mounted on either side of said head, a bail member pivotally secured to said pins for suspending the head, and means formed integral with said pins to facilitate their removal from their bearings to release the bail.

3. In a device of the character herein described a hydraulic head for oil wells provided with oppositely disposed bearing pins having lubricating cavities formed on said head adjacent said bearing pins, the pins passing through said cavities, and a bail for supporting said head pivotally attached to said pins.

4. In a device of the character described, a body member provided with a pair of oppositely disposed removable bearing pins, a pin lubricating cavity being formed on said body member and surrounding each bearing pin, and a bail member pivotally attached to said bearing pins.

5. In a device of the character described a body member provided with a pair of oppositely disposed bearing pins, the outer end of each pin having a flange secured thereto, a bail pivotally attached to said pins, and means engaging the flanges of the pins to remove the same from their bearings when it is desired to detach the bail from the body member.

6. A device of the class described, comprising a body member having oppositely disposed lubricating chambers formed on its outer surface, and a bail pivoted to said body member and mounted to swing in said lubricant chambers.

In witness that I claim the foregoing I have hereunto subscribed my name this 23rd day of June, 1924.

PAUL F. YUNGLING.